(12) United States Patent
Sun et al.

(10) Patent No.: US 11,433,999 B2
(45) Date of Patent: Sep. 6, 2022

(54) VEHICLE CAPABLE OF TAKING OFF AND LANDING VERTICALLY AND OPERATING IN WATER, LAND, AIR AND SUBMARINE ENVIRONMENTS

(71) Applicant: DALIAN UNIVERSITY OF TECHNOLOGY, Liaoning (CN)

(72) Inventors: Ximing Sun, Liaoning (CN); Hongyang Zhao, Liaoning (CN); Zhuocheng Jiang, Liaoning (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 282 days.

(21) Appl. No.: 16/769,482

(22) PCT Filed: Apr. 26, 2019

(86) PCT No.: PCT/CN2019/084492
§ 371 (c)(1),
(2) Date: Jun. 3, 2020

(87) PCT Pub. No.: WO2020/215304
PCT Pub. Date: Oct. 29, 2020

(65) Prior Publication Data
US 2021/0129981 A1 May 6, 2021

(30) Foreign Application Priority Data
Apr. 22, 2019 (CN) .......................... 201910321516.9

(51) Int. Cl.
*B64C 29/00* (2006.01)
*B64C 27/26* (2006.01)
(Continued)

(52) U.S. Cl.
CPC .......... *B64C 29/0033* (2013.01); *B64C 27/26* (2013.01); *B63G 8/14* (2013.01);
(Continued)

(58) Field of Classification Search
CPC ........ B64C 2201/104; B64C 2201/108; B64C 29/0025; B64C 29/0033; B64C 27/28; B60F 5/02
See application file for complete search history.

(56) References Cited

U.S. PATENT DOCUMENTS

| 5,037,040 A | * | 8/1991 | Goltz | ..................... F41G 7/2233 244/3.22 |
| 2017/0036753 A1 | * | 2/2017 | Shue | ....................... B64C 13/04 |
| 2020/0062386 A1 | * | 2/2020 | Zhang | ....................... B60F 5/02 |

FOREIGN PATENT DOCUMENTS

| CN | 105460214 A | 4/2016 |
| CN | 107639984 A | 1/2018 |

(Continued)

*Primary Examiner* — Tye William Abell
(74) *Attorney, Agent, or Firm* — Muncy, Geissler, Olds & Lowe, P.C.

(57) ABSTRACT

A vehicle capable of taking off and landing vertically and operating in water, land, air and submarine environments includes a fuselage, two main wings, ailerons, a vertical tail, a rudder, a horizontal tail, elevators, a propeller, rotor wings, rotor wing supports, etc. The vehicle has the advantages of adaptability to various environments, good concealment and strong survivability. Compared with a traditional unmanned rotorcraft, the vehicle has longer endurance time and larger load. Compared with a fixed wing UAV, the vertical take-off and landing function makes the work more convenient. Compared with unmanned diving equipment, the vehicle is applicable to richer environments, and can complete designated missions in air, land, water and submarine environments. Compared with a tilt rotor UAV in water, land, air and submarine environments, the vehicle is rapider in switching of various modes and is higher in stability.

1 Claim, 12 Drawing Sheets

(51) Int. Cl.
 *B63G 8/14* (2006.01)
 *B63G 8/00* (2006.01)
 *B64C 27/28* (2006.01)

(52) U.S. Cl.
 CPC ........ *B63G 2008/002* (2013.01); *B64C 27/28* (2013.01); *B64C 29/0025* (2013.01); *B64C 2201/042* (2013.01); *B64C 2201/104* (2013.01); *B64C 2201/108* (2013.01)

(56) References Cited

FOREIGN PATENT DOCUMENTS

| | | |
|---|---|---|
| CN | 207772810 U | 8/2018 |
| CN | 109263954 A | 1/2019 |
| CN | 209290683 U | 8/2019 |
| EP | 0384965 A3 | 9/1990 |

\* cited by examiner

VEHICLE CAPABLE OF TAKING OFF AND LANDING VERTICALLY AND OPERATING IN WATER, LAND, AIR AND SUBMARINE ENVIRONMENTS

TECHNICAL FIELD

The present invention relates to a vehicle capable of taking off and landing vertically and operating in water, land, air and submarine environments, and belongs to the technical field of unmanned aerial vehicles and unmanned submersibles.

BACKGROUND

To complete some missions that are difficult, dangerous, and inconvenient for manual operation, unmanned aerial vehicle (UAV) emerges. With the development of science and technology, the UAV is applied to wider fields, and have more and more important applications in many aspects such as entertainment, agriculture and forestry protection, geological survey and popular science research. With the increase of application occasions of the UAV, there is an urgent need for the UAV which can navigate in multiple environments. A traditional unmanned rotorcraft has short endurance time and small load. A fixed wing UAV has high requirements for taking-off and landing environments and cannot satisfy vertical take-off and landing. A tilt rotor UAV has poor mode switching stability. Unmanned submersible vehicles or unmanned ships can work under submarine or water environments, and cannot fly. The above UAVs have narrow application ranges and obvious advantages and disadvantages. Therefore, the present invention researches a vehicle capable of taking off and landing vertically and operating in water, land, air and submarine environments. The vehicle can achieve stable operation in four environments, and complete predetermined combat missions. The four environments include air, land, water and submarine environments.

SUMMARY

Aiming at the problems of narrow application range and single function of a traditional unmanned aerial vehicle, the present invention provides a vehicle capable of taking off and landing vertically and operating in water, land, air and submarine environments.

The technical solution of the present invention is:

The vehicle capable of taking off and landing vertically and operating in water, land, air and submarine environments comprises a fuselage 1, two main wings 2, two ailerons 3, a vertical tail 4, a rudder 5, a horizontal tail 6, two elevators 7, a propeller 8, four rotor wings 9, four rotor wing supports 10, four retracting and releasing shafts 11, two rear fuselage caissons 12, two middle fuselage caissons 13, four front fuselage caissons 14, two front attitude control hatches 15, two rear attitude control hatches 16, a vector thruster 17 and three landing gears 18.

The two main wings 2 are of wing-shaped structures which are symmetrical about a central axis, and are driven by a steering engine to rotate around fixed ends, and furled toward the fuselage 1; the two ailerons 3 are of rectangular structures, are fixedly connected to the tails of the two main wings 2 respectively and swing up and down around fixed ends; the vertical tail 4 is positioned on the central axis and positioned on the tail of the fuselage 1 and is perpendicular to the fuselage 1; the rudder 5 is of a rectangular structure, is fixedly connected to the tail of the vertical tail 4 and swings left and right around a fixed end; the horizontal tail 6 is of a wing-shaped structure that is symmetrical about the central axis, is integrated with the fuselage 1 and positioned on the tail of the fuselage 1, and is perpendicular to the vertical tail 4; the two elevators 7 are of rectangular structures, are fixedly connected to the tail of the horizontal tail 6 respectively and swing up and down around fixed ends; the propeller 8 is positioned in front of the fuselage 1 and connected with a fuselage main beam.

The four rotor wings 9 are respectively fixed to the four rotor wing supports 10; the four rotor wing supports 10 are respectively connected with the fuselage 1 through the four retracting and releasing shafts 11; the retracting and releasing shafts 11 are driven by a rotor wing retracting and releasing steering engine to furl toward the fuselage; connection positions of the four retracting and releasing shafts 11 and the fuselage 1 are symmetrically distributed about the center of gravity of an aircraft; in a rotor wing attitude, a design center of gravity is located 160 mm away from the leading edge of the wing deployment; the four rotor wings 9 are respectively driven by four motors for landing; the countershaft wheelbase of the four motors for landing is 1156 mm and the diagonal wheelbase is 1715 mm; and the rotation speed of each rotor wing 9 is independently controlled to achieve vertical take-off and landing and navigation in the attitudes of the rotor wings 9.

The two rear fuselage caissons 12 and the four front fuselage caissons 14 are fixed to the lower part of the fuselage 1; the two middle fuselage caissons 13 are positioned below the fuselage 1 and can extend from the fuselage 1 to ensure the stability of the fuselage 1 when surfaced; the caissons are symmetrically arranged about the central axes of the fuselage; four central axes are respectively arranged on the left side and the right side; and the caissons run through the fuselage, and the length of each section is equal.

The two front attitude control hatches 15 are positioned in front of the fuselage 1 and are symmetrical about the central axis; the two rear attitude control hatches 16 are positioned at the rear of the fuselage 1 and are symmetrical about the central axis; the attitude control hatches jointly adjust the altitude of the vehicle in water; the vector thruster 17 is positioned at the tail of the fuselage 1 and provides submarine power for the vehicle; the three landing gears 18 are positioned below the fuselage 1; power wheels are driven by belt drive to achieve land walking, and the direction is controlled by steering wheels.

The present invention has beneficial effects: the vehicle has the advantages of adaptability to various environments, good concealment and strong survivability. Compared with a traditional unmanned rotorcraft, the present invention has longer endurance time and larger load. Compared with a fixed wing UAV, the vertical take-off and landing function of the present invention makes the work more convenient. Compared with unmanned diving equipment, the present invention is applicable to richer environments, and can complete designated missions in air, land, water and submarine environments. Compared with a tilt rotor UAV in water, land, air and submarine environments, the present invention is rapider in switching of various modes and is higher in stability.

DESCRIPTION OF DRAWINGS

FIG. 7 (b) is a schematic diagram of flight attitude roll control of a rotor wing of the present invention;

FIG. 7 (c) is a schematic diagram of flight attitude yaw control of a rotor wing of the present invention;

In the figures: 1 fuselage; 2 main wing; 3 aileron; 4 vertical tail; 5 rudder; 6 horizontal tail; 7 elevator; 8 propeller; 9 rotor wing; 10 rotor wing support; 11 retracting and releasing shaft; 12 rear fuselage caisson; 13 middle fuselage caisson; 14 front fuselage caisson; 15 front attitude control hatch; 16 rear attitude control hatch; 17 vector thruster; and 18 landing gear.

DETAILED DESCRIPTION

The present invention is further described below in combination with the technical solution and the drawings.

Figure 1:
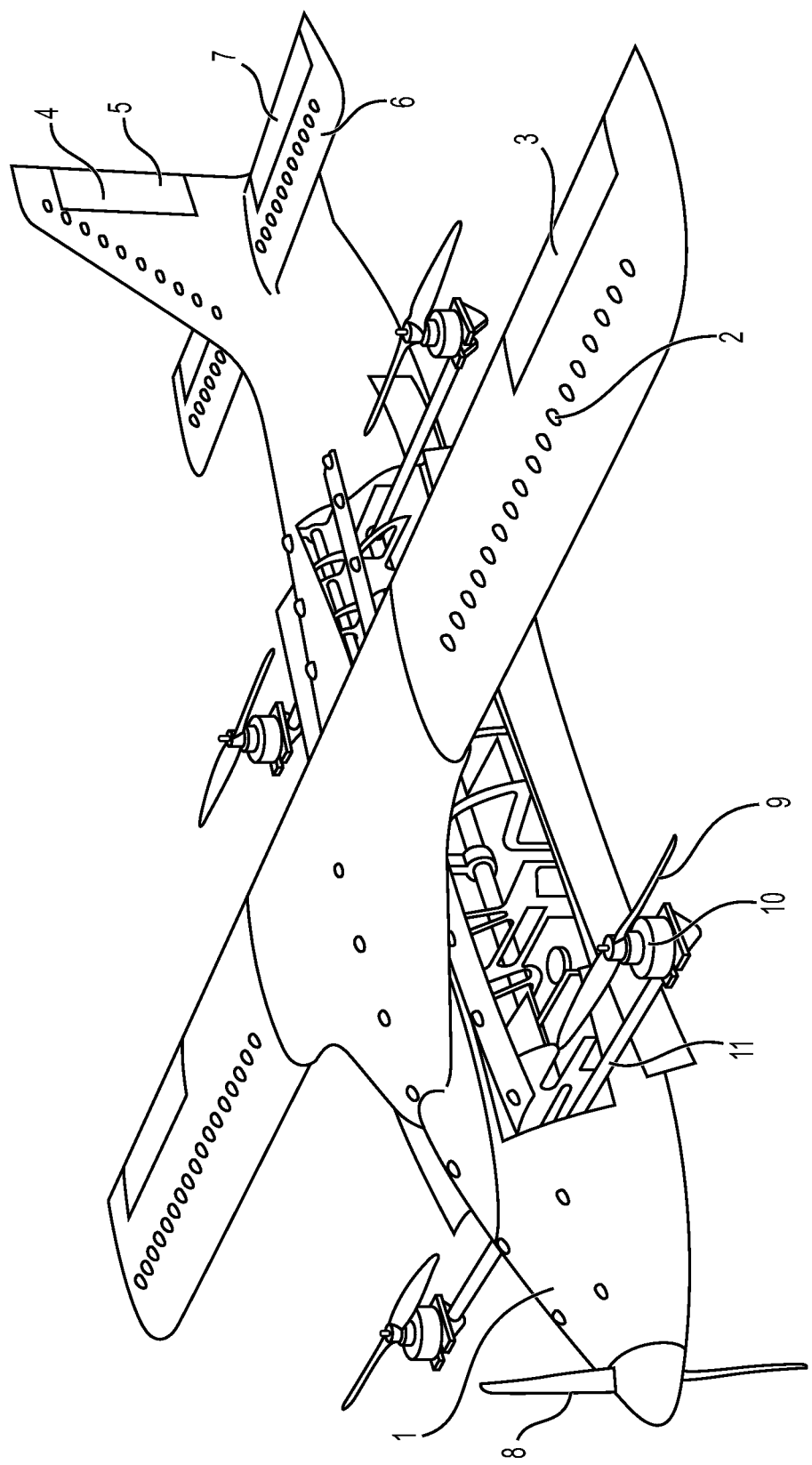
FIG. 1 is a top view of the present invention.
Figure 2:
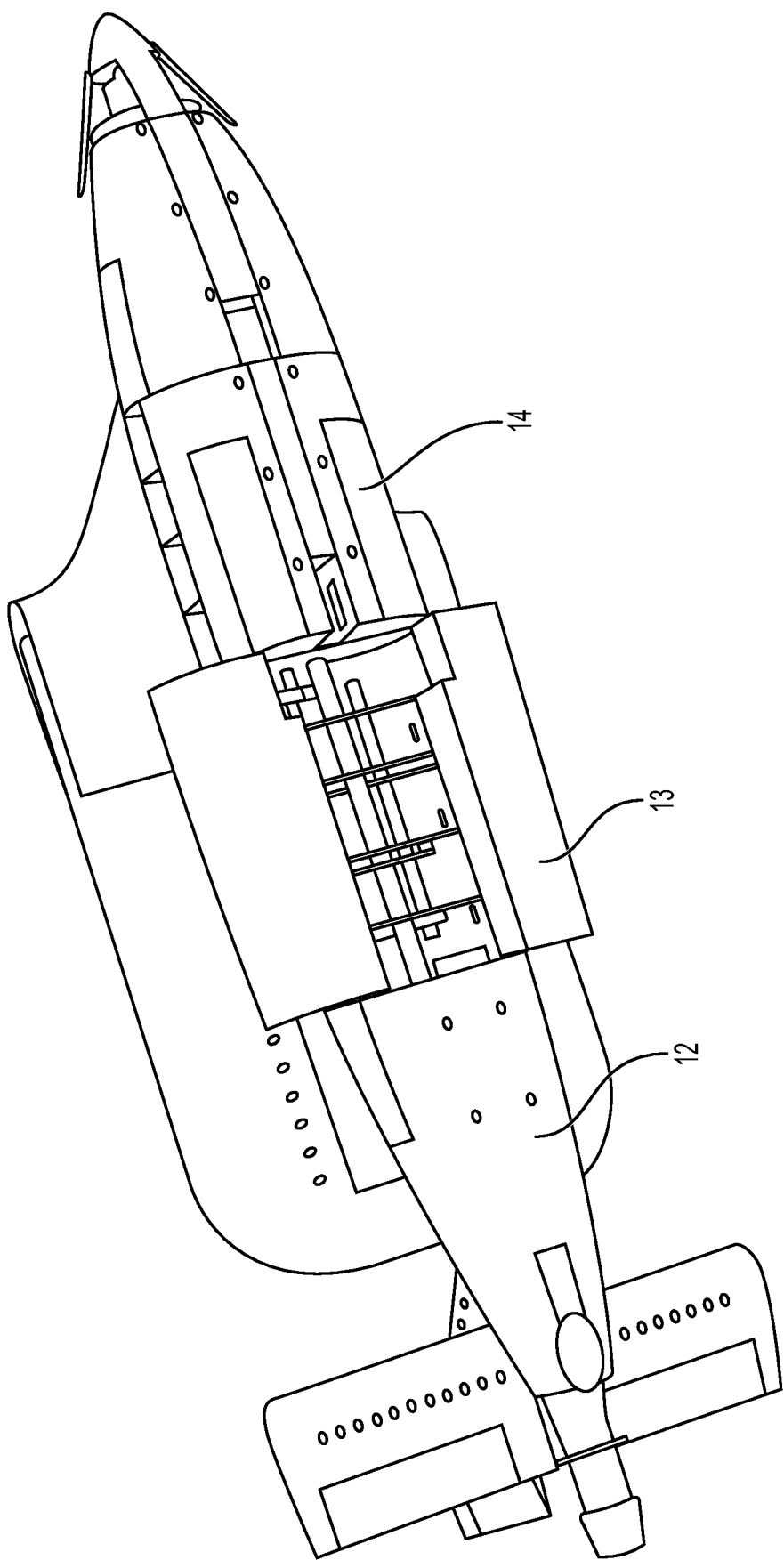
FIG. 2 is a bottom view 1 of the present invention.
Figure 3:
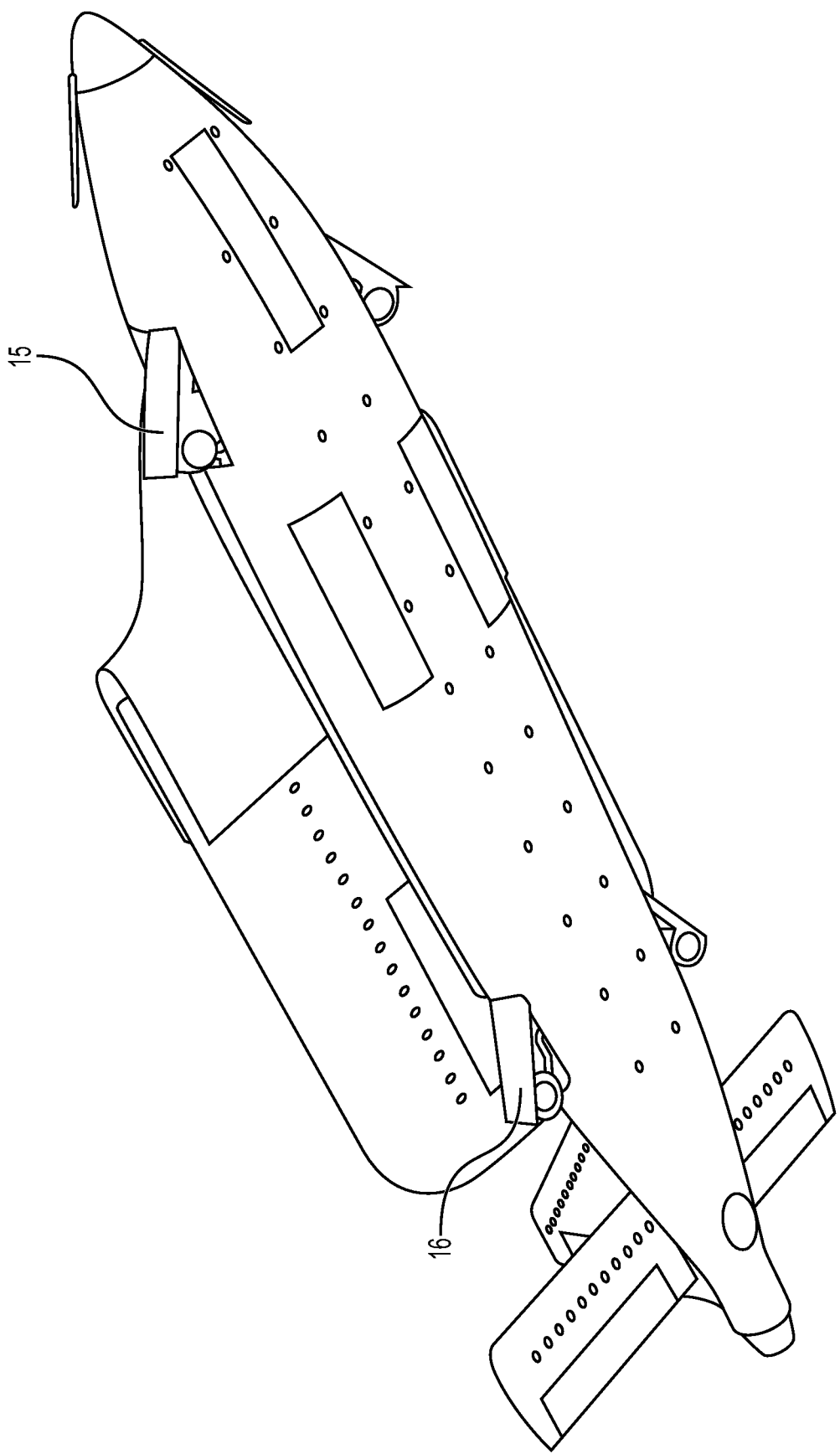
FIG. 3 is a bottom view 2 of the present invention.
Figure 4:
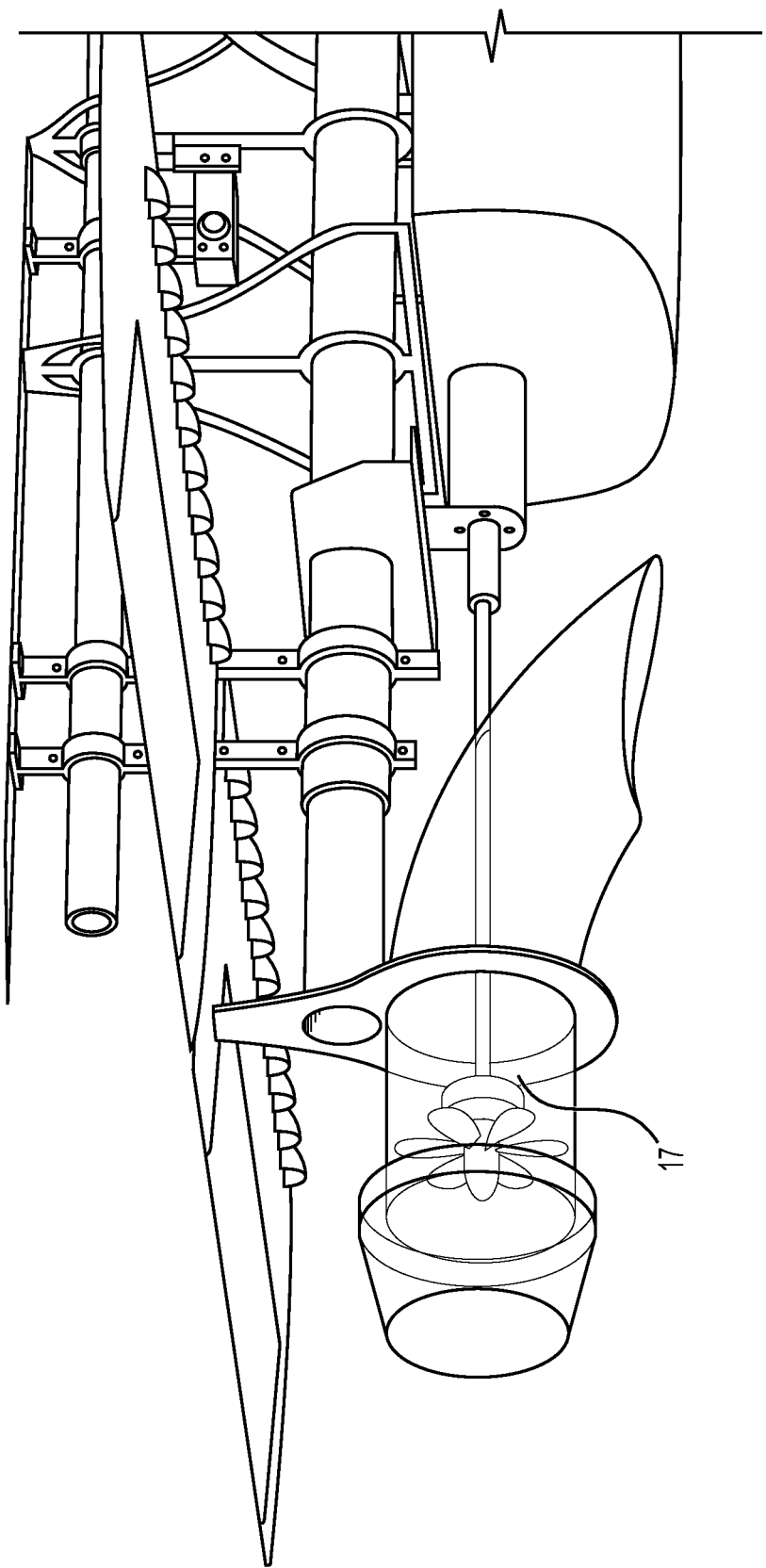
FIG. 4 is a schematic diagram of a vector thruster of the present invention.
Figure 5:
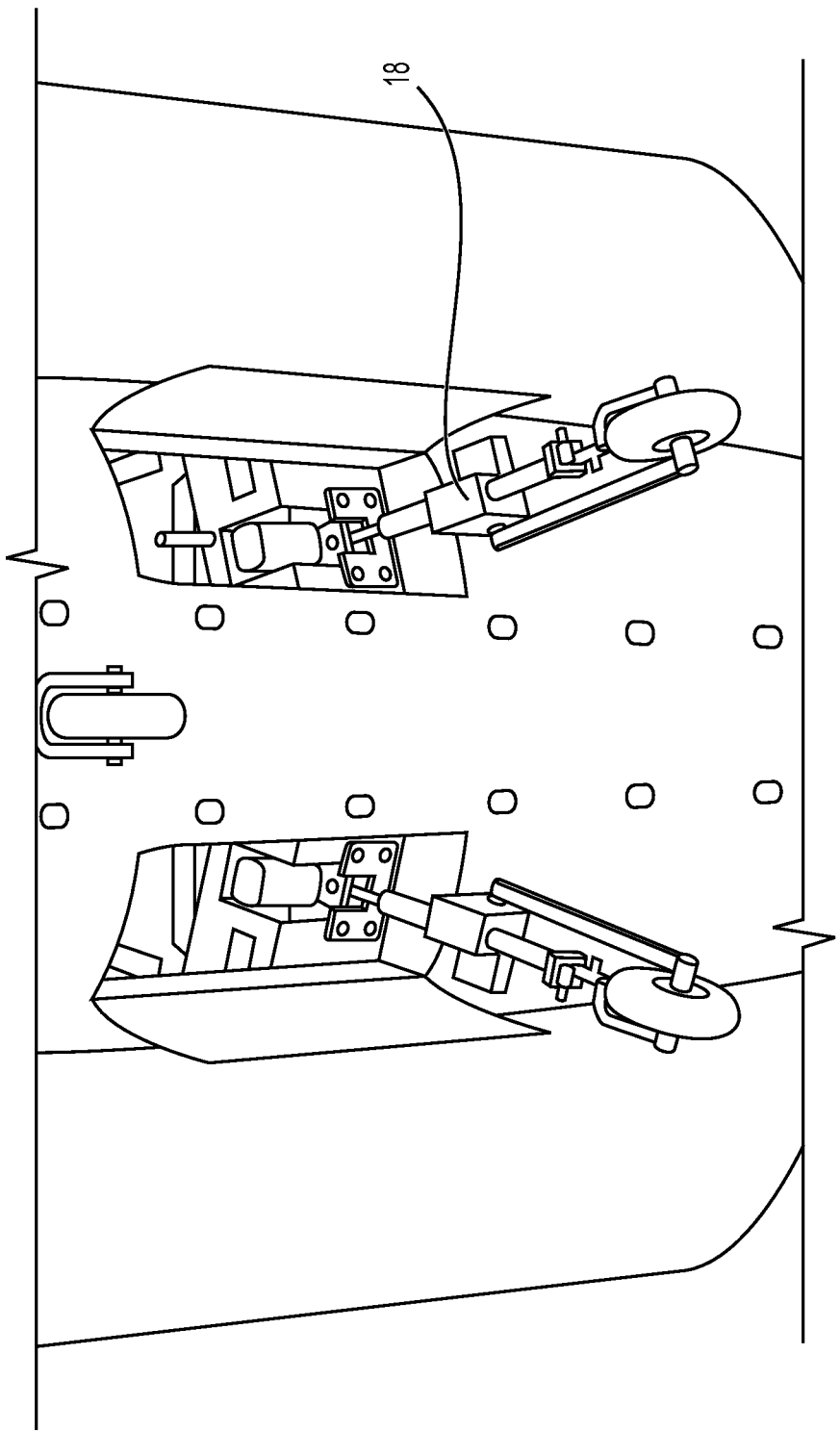
FIG. 5 is a schematic diagram of a landing gear of the present invention.
Figure 6:
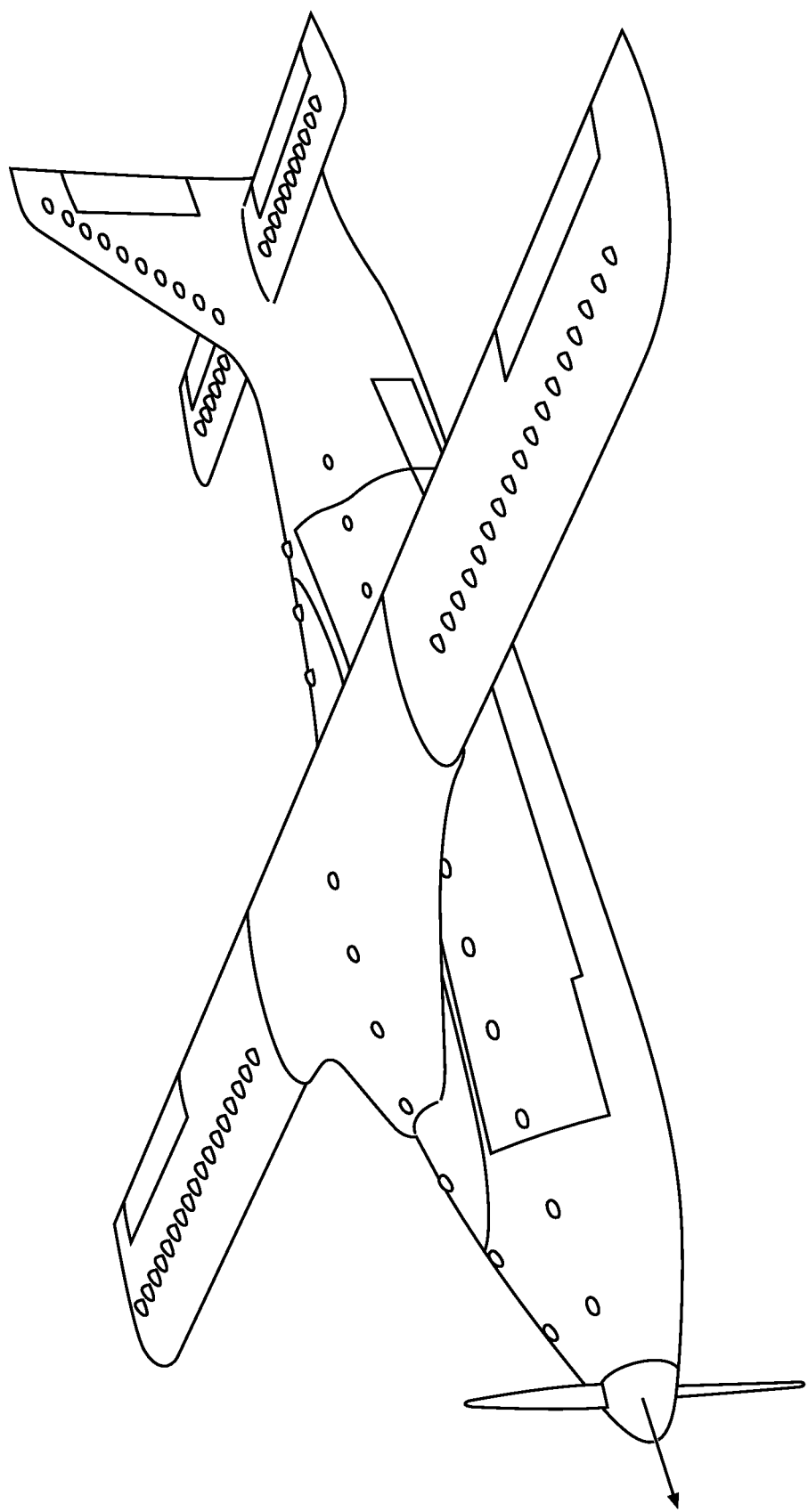
FIG. 6 is a schematic diagram of flight attitude control of a fixed wing of the present invention.
Figure 7A:
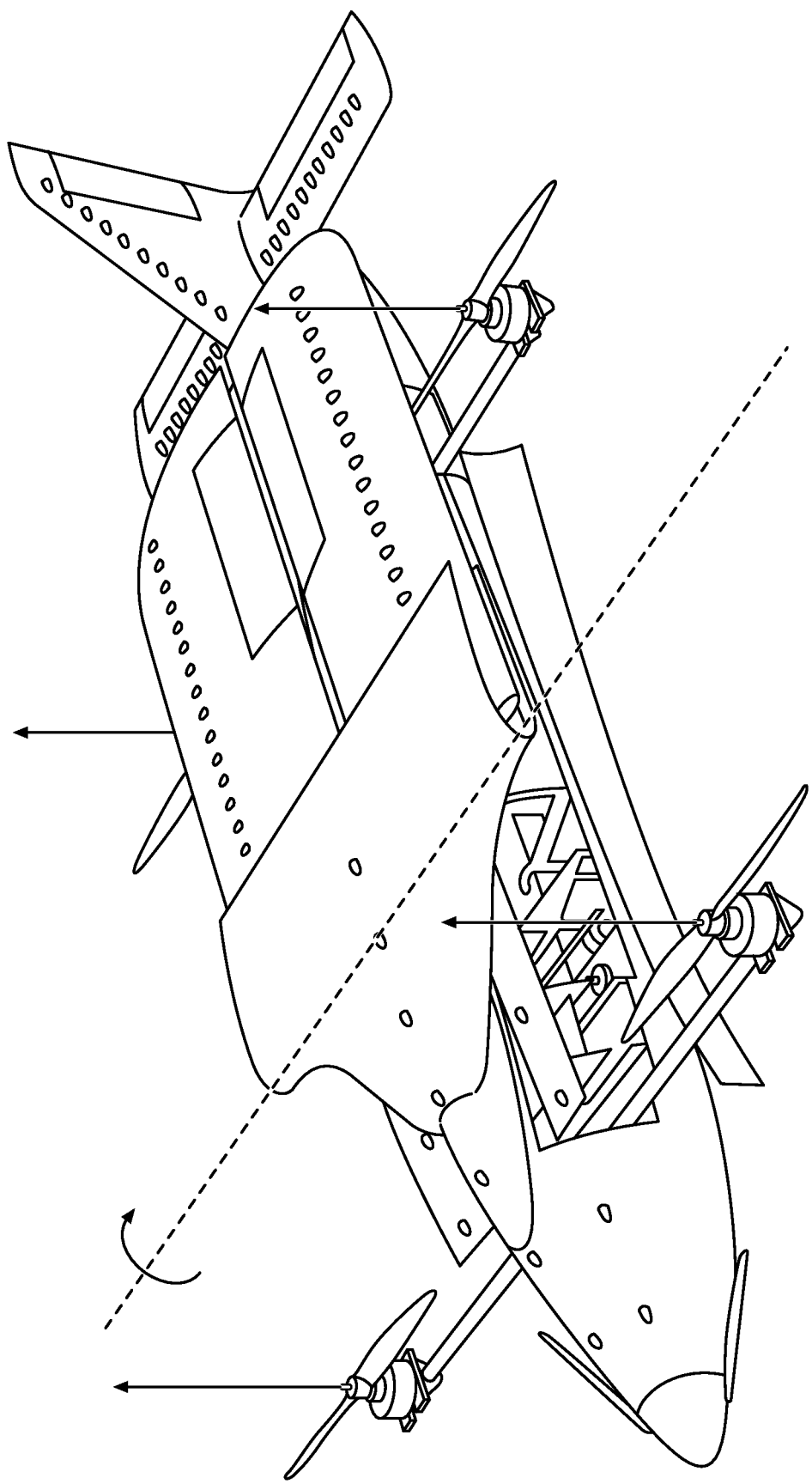
FIG. 7 (a) is a schematic diagram of flight attitude pitch control of a rotor wing of the present invention.
Figure 7B:
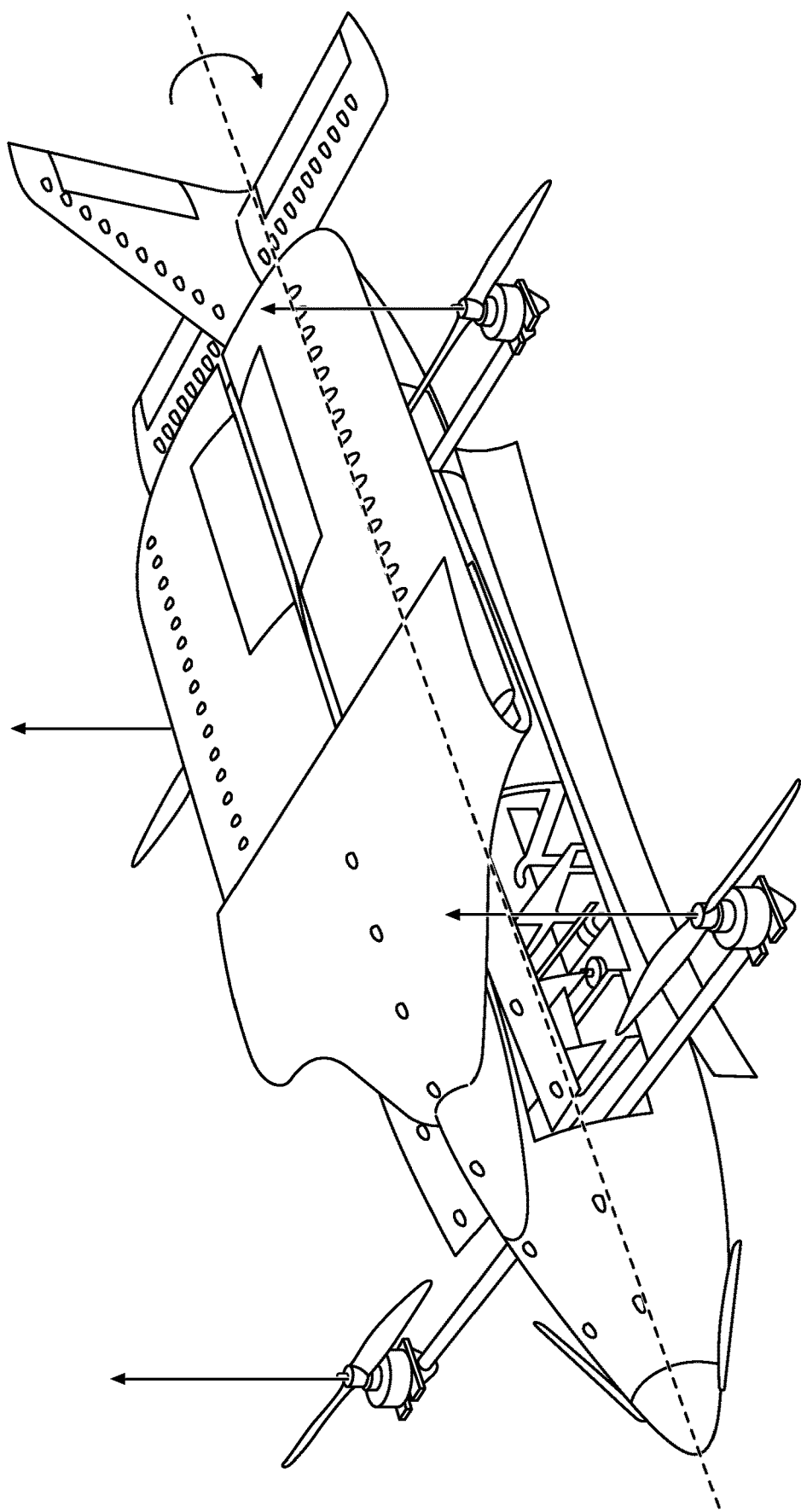
Figure 7C:
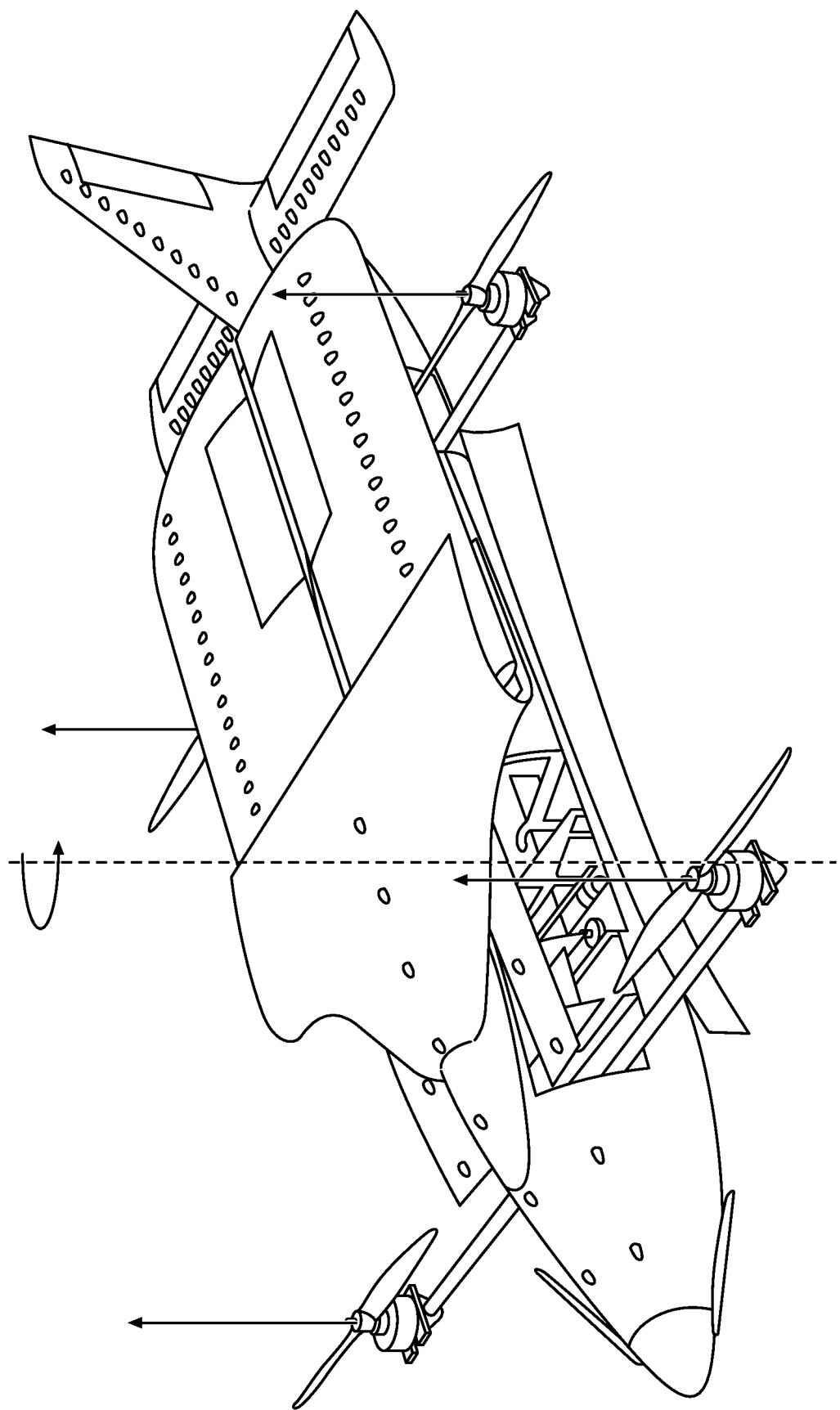
Figure 8:
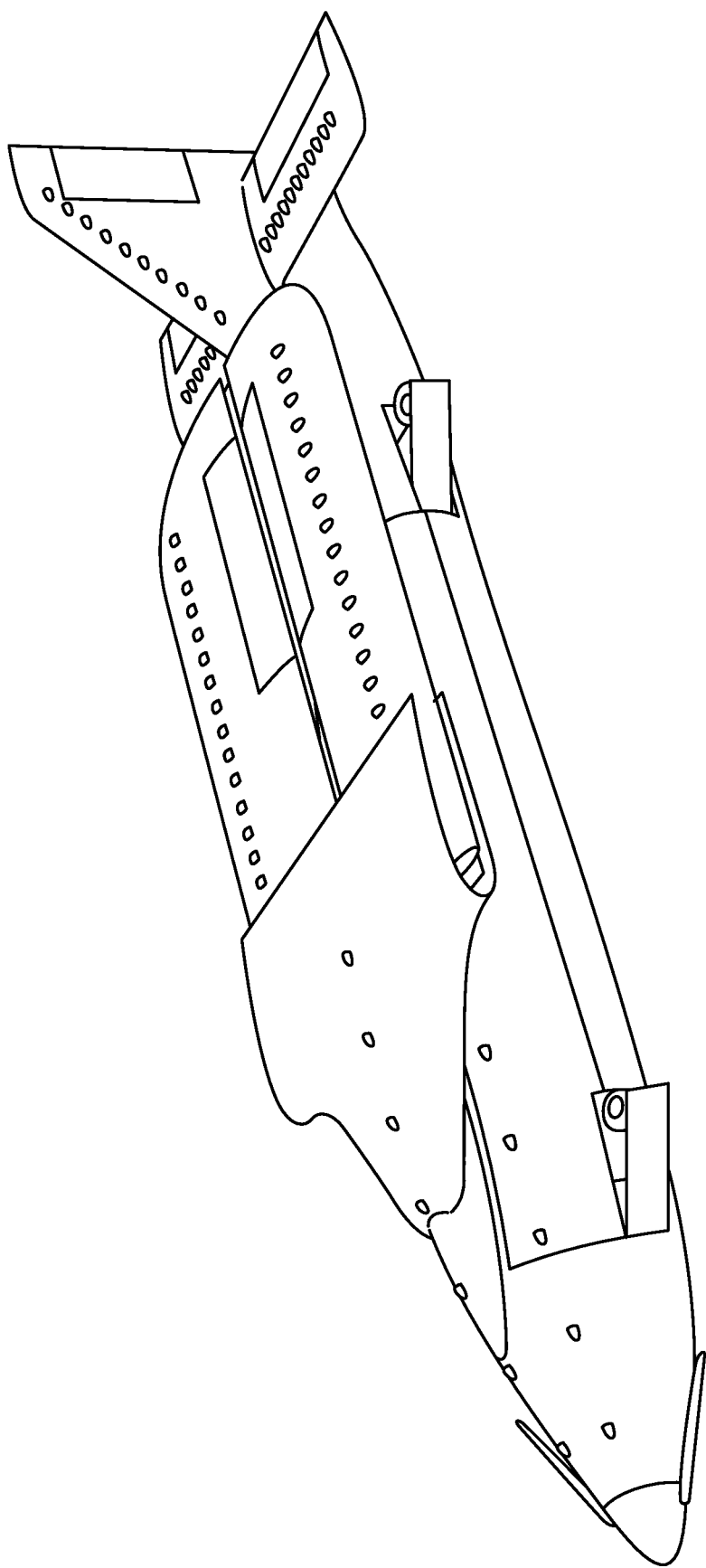
FIG. 8 is a schematic diagram of a submarine navigation attitude of the present invention.
Figure 9:
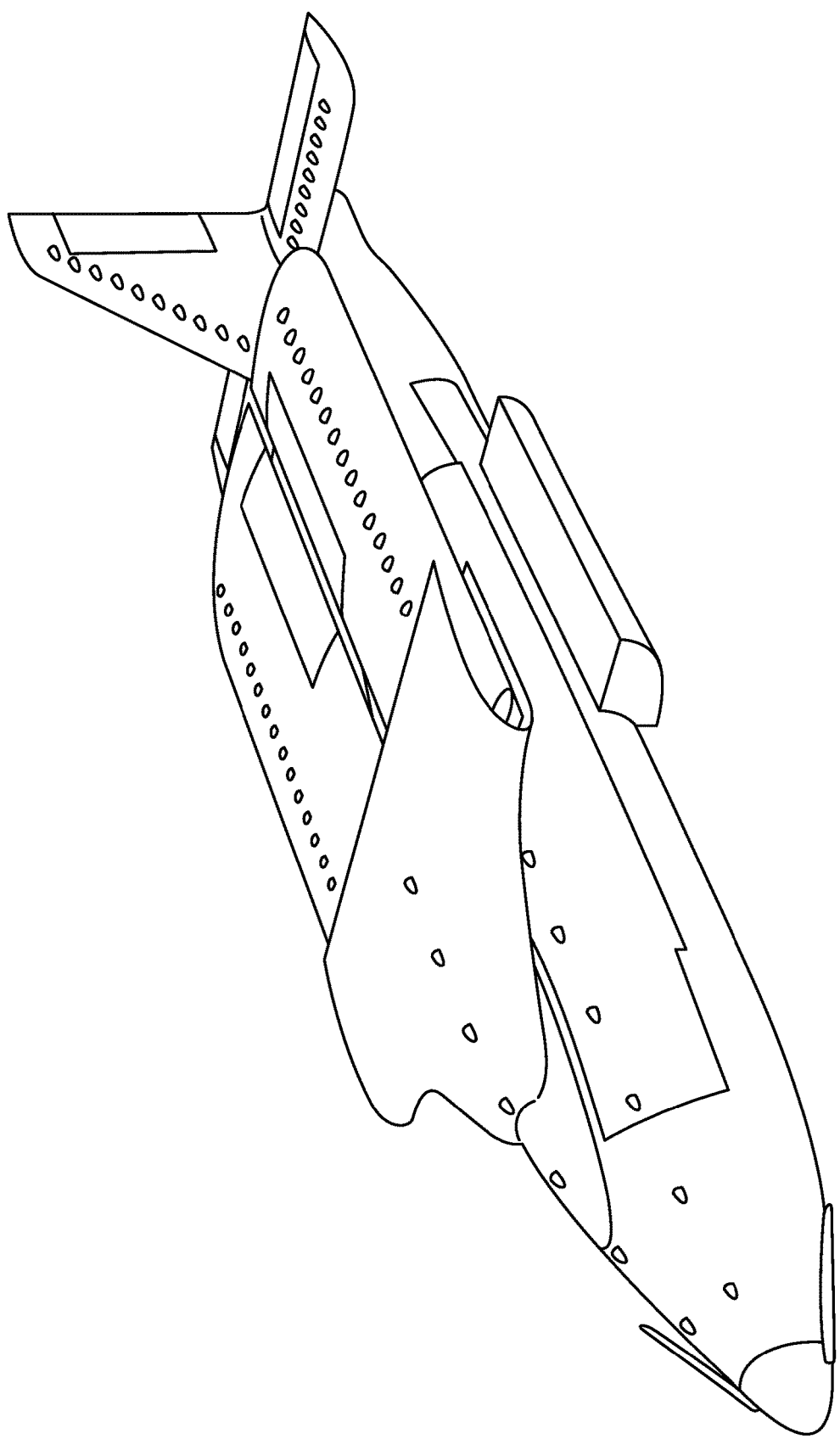
FIG. 9 is a schematic diagram of a surfacing attitude of the present invention.
Figure 10:
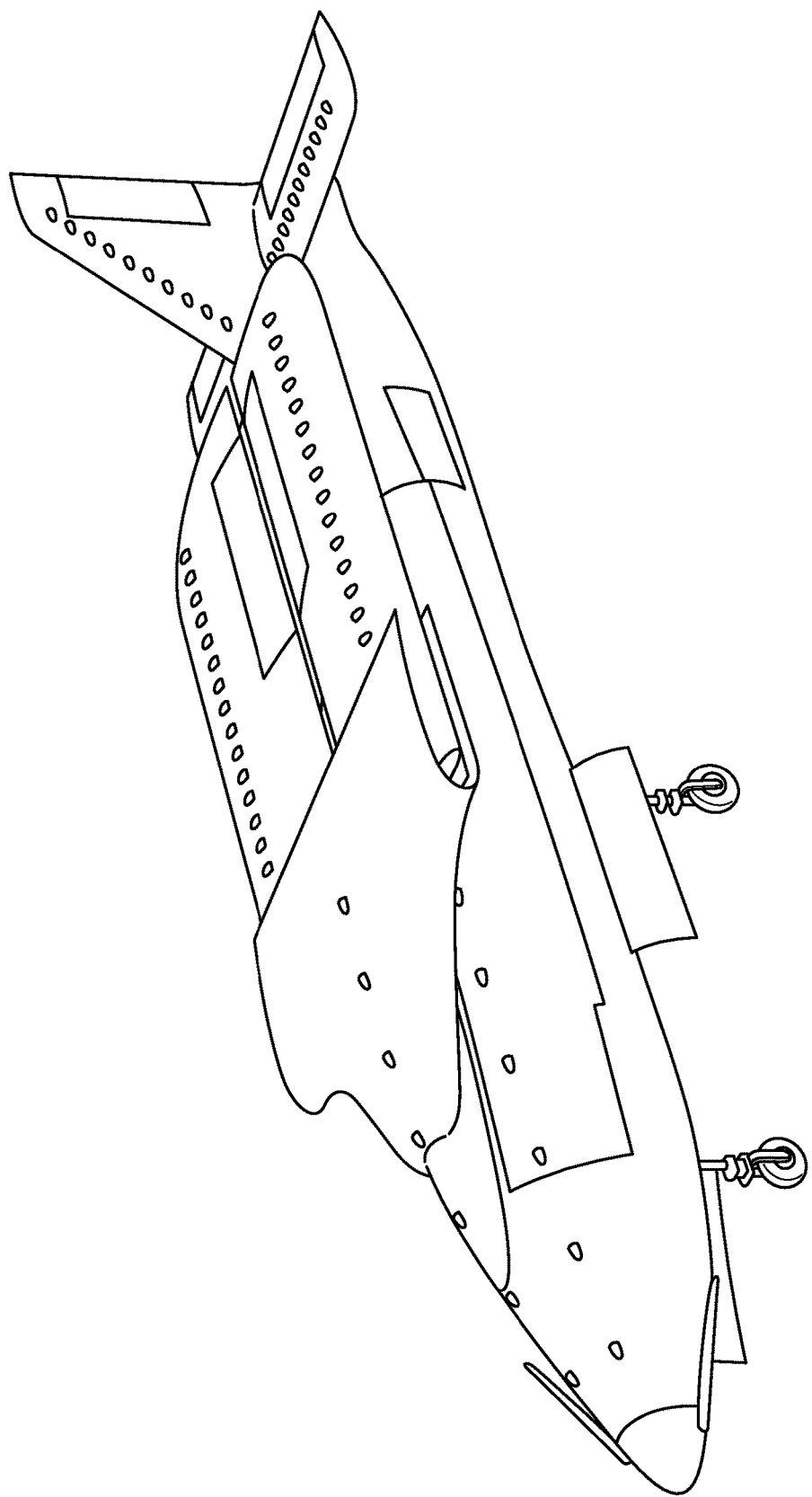
FIG. 10 is a schematic diagram of a land walking attitude of the present invention.

In combination with FIGS. 1-10, a vehicle capable of taking off and landing vertically and operating in water, land, air and submarine environments comprises a fuselage 1, two main wings 2, two ailerons 3, a vertical tail 4, a rudder 5, a horizontal tail 6, two elevators 7, a propeller 8, four rotor wings 9, four rotor wing supports 10, four retracting and releasing shafts 11, two rear fuselage caissons 12, two middle fuselage caissons 13, four front fuselage caissons 14, two front attitude control hatches 15, two rear attitude control hatches 16, a vector thruster 17 and three landing gears 18.

The two main wings 2 are of wing-shaped structures which are symmetrical about a central axis, and can be driven by a steering engine to rotate around fixed ends, and furled toward the fuselage 1; the two ailerons 3 are of rectangular structures, are fixedly connected to the tails of the two main wings 2 respectively and can swing up and down around fixed ends; the vertical tail 4 is positioned on the central axis and positioned on the tail of the fuselage; the rudder 5 is of a rectangular structure, is fixedly connected to the vertical tail 4 and can swing left and right around a fixed end; the horizontal tail 6 is of a wing-shaped structure that is symmetrical about the central axis, and is integrated with the fuselage 1; the two elevators 7 are of rectangular structures, are fixedly connected to the horizontal tail 6 respectively and can swing up and down around fixed ends; and the propeller 8 is positioned in front of the fuselage and connected with a fuselage main beam.

The four rotor wings 9 are respectively fixed to the four rotor wing supports 10; the four rotor wing supports 10 are respectively connected with the fuselage through the four retracting and releasing shafts 11; the retracting and releasing shafts 11 can be driven by a rotor wing retracting and releasing steering engine to furl toward the fuselage; connection positions of the four retracting and releasing shafts 11 and the fuselage are symmetrically distributed about the center of gravity of an aircraft; in a rotor wing attitude, a design center of gravity is located 160 mm away from the leading edge of the wing deployment; the four rotor wings 9 are respectively driven by four motors for landing; the countershaft wheelbase of the four motors for landing is 1156 mm and the diagonal wheelbase is 1715 mm; and the rotation speed of each rotor wing is independently controlled to achieve vertical take-off and landing and navigation in the attitudes of the rotor wings.

The two rear fuselage caissons 12 and the four front fuselage caissons 14 are fixed to the lower part of the fuselage 1; the two middle fuselage caissons 13 are positioned below the fuselage 1 and can extend from the fuselage to ensure the stability of the fuselage when surfaced; the caissons are symmetrically arranged about the central axes of the fuselage; four central axes are respectively arranged on the left side and the right side; and the caissons run through the fuselage, and the length of each section is equal.

The two front attitude control hatches 15 are positioned in front of the fuselage and are symmetrical about the central axis; the two rear attitude control hatches 16 are positioned at the rear of the fuselage and are symmetrical about the central axis; the attitude control hatches jointly adjust the altitude of the vehicle in water; the vector thruster 17 is positioned at the tail of the fuselage and provides submarine power for the vehicle; the three landing gears 18 are positioned below the fuselage; power wheels are driven by belt drive to achieve land walking, and the direction is controlled by steering wheels.

The present invention has five operating attitudes:

(1) Fixed Wing Flight Attitude

Two main wings 2 are in a deployment status and perpendicular to the fuselage. Four rotor wing structures are recovered into the fuselage. The motor is pulled forward to control the rotation speed of the propeller 8 to change the flight speed. The flight attitude of the vehicle is adjusted by controlling the ailerons 3, the rudder 5 and the elevators 7.

(2) Rotor Wing Flight Attitude

Two main wings 2 are in a recovery status and parallel to the fuselage. Four rotor wing structures are in a deployment status. The size of the pulling force generated by each rotor wing is changed by controlling the rotation speed of the four rotor wings, so as to control the attitude of the vehicle.

Pitch control: the difference between the pulling force generated by the two rotor wings in front of the vehicle and the pulling force generated by the two rotor wings at the rear is changed to control a pitch angle.

Roll control: the difference between the pulling force generated by the two rotor wings on the left of the vehicle and the pulling force generated by the two rotor wings at the right is changed to control a roll angle.

Yaw control: the difference in the pulling forces generated by two pairs of rotor wings on different diagonals of the vehicle is changed to control a yaw angle.

(3) Submarine Navigation Attitude

Two main wings 2 are in a recovery status. Four rotor wing structures are recovered into the fuselage. The storage capacity of gas of the caissons is changed to control a submergence depth. The vector thruster 17 at the tail controls the speed of submarine navigation, and the submarine navigation direction is adjusted by controlling the rotation of the rudder 5.

Pitch control: the difference between the storage capacity of gas of the rear fuselage caissons and the storage capacity of gas of the front fuselage caissons is changed to generate a difference in buoyancy, so as to control the pitch angle.

Roll control: the difference between the storage capacities of gas of the left and the right fuselage caissons is changed to generate a difference in buoyancy, so as to control the roll angle.

(4) Surfacing Attitude

Two main wings 2 are in a recovery status. Four rotor wing structures are recovered into the fuselage. The middle fuselage caissons 13 extend from the fuselage to ensure the stability of the fuselage on water.

(5) Land Walking Attitude

Two main wings 2 are in a recovery status. Four rotor wing structures and the middle fuselage caissons 13 are recovered into the fuselage. The three landing gears 18 extend from the fuselage. Power wheels are driven by belt drive to achieve land walking, and the direction is controlled by steering wheels.

The invention claimed is:

1. A vehicle capable of taking off and landing vertically and operating in water, land, air and submarine environments, the vehicle capable of taking off and landing vertically and operating in water, land, air and submarine environments comprising:

a fuselage, two main wings, two ailerons, a vertical tail, a rudder, a horizontal tail, two elevators, a propeller, four rotor wings, four rotor wing supports, four retracting and releasing shafts, two rear fuselage caissons, two middle fuselage caissons, four front fuselage caissons, two front attitude control hatches, two rear attitude control hatches, a vector thruster and three landing gears, wherein the two main wings are of rectangular structures which are symmetrical about a central axis, and are driven by a steering engine to rotate around fixed ends, and furled toward the fuselage;

the two ailerons are of rectangular structures, are fixedly connected to a tail of the two main wings respectively and swing up and down around fixed ends;

the vertical tail is positioned on the central axis and positioned on a tail of the fuselage and is perpendicular to the fuselage;

the rudder is of a rectangular structure, is fixedly connected to a tail of the vertical tail and swings left and right around a fixed end;

the horizontal tail is of a rectangular structure that is symmetrical about the central axis, is integrated with the fuselage and positioned on the tail of the fuselage, and is perpendicular to the vertical tail;

the two elevators are of rectangular structures, are fixedly connected to a tail of the horizontal tail respectively and swing up and down around fixed ends;

the propeller is positioned at a front of the fuselage and connected with a fuselage main beam;

the four rotor wings are respectively fixed to the four rotor wing supports;

the four rotor wing supports are respectively connected with the fuselage through the four retracting and releasing shafts;

the retracting and releasing shafts are driven by a rotor wing retracting and releasing steering engine to furl toward the fuselage;

connection positions of the four retracting and releasing shafts and the fuselage are symmetrically distributed about a center of gravity of the vehicle;

in a rotor wing attitude, the center of gravity is located 160 mm behind a leading edge of the two main wings;

the four rotor wings are respectively driven by four motors for landing;

a wheelbase of the four motors for landing is 1156 mm and a diagonal wheelbase is 1715 mm;

a rotation speed of each rotor wing is independently controlled to achieve vertical take-off and landing and navigation in the attitudes of the rotor wings;

the two rear fuselage caissons and the four front fuselage caissons are fixed to a lower part of the fuselage;

the two middle fuselage caissons are positioned below the fuselage and can extend from the fuselage to ensure stability of the fuselage when surfaced;

the caissons are symmetrically arranged about the central axis of the fuselage;

four central axes are respectively arranged on the left side and the right side; and the caissons run through the fuselage, a length of each section of the caissons is equal;

the two front attitude control hatches are positioned at a front of the fuselage and are symmetrical about the central axis;

the two rear attitude control hatches are positioned at the rear of the fuselage and are symmetrical about the central axis;

the attitude control hatches jointly adjust an altitude of the vehicle in water;

the vector thruster is positioned at the tail of the fuselage and provides submarine power for the vehicle;

the three landing gears are positioned below the fuselage;

power wheels are driven by belt drive to achieve land walking, and the direction is controlled by steering wheels.

\* \* \* \* \*